(12) United States Patent
Bajunaid

(10) Patent No.: US 12,268,568 B1
(45) Date of Patent: Apr. 8, 2025

(54) CROWN REMOVER

(71) Applicant: KING SAUD UNIVERSITY, Riyadh (SA)

(72) Inventor: Salwa Omar Bajunaid, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/895,561

(22) Filed: Sep. 25, 2024

Related U.S. Application Data

(63) Continuation-in-part of application No. 18/392,645, filed on Dec. 21, 2023, now abandoned.

(51) Int. Cl.
*A61C 3/16* (2006.01)
*A61C 3/14* (2006.01)

(52) U.S. Cl.
CPC ............... *A61C 3/162* (2013.01); *A61C 3/14* (2013.01)

(58) Field of Classification Search
CPC .. A61C 3/14; A61C 3/16; A61C 3/162; A61C 3/164; A61C 3/166; A61C 3/168
USPC ....................................................... 433/161
See application file for complete search history.

(56) References Cited

U.S. PATENT DOCUMENTS

| | | | | |
|---|---|---|---|---|
| 1,110,379 A * | 9/1914 | Craig | ............. | A61C 5/85 433/158 |
| 1,666,860 A * | 4/1928 | Maranda | ............. | A61C 3/14 433/161 |
| 2,428,689 A * | 10/1947 | Sykes | ............. | A61C 19/04 433/157 |
| 2,430,271 A * | 11/1947 | Brantley | ............. | A61C 3/14 254/131 |
| 2,777,198 A * | 1/1957 | Wallace | ............. | A61C 3/14 433/118 |
| 2,977,683 A * | 4/1961 | Wiltse | ............. | A61C 3/14 433/98 |
| 3,357,104 A * | 12/1967 | Greene | ............. | A61C 9/00 433/38 |
| 3,468,031 A * | 9/1969 | Mumaw | ............. | A61C 3/14 433/141 |
| 3,755,901 A * | 9/1973 | Wilson | ............. | A61C 3/16 433/161 |
| 4,230,454 A * | 10/1980 | Lococo | ............. | A61C 3/14 433/161 |
| 4,443,196 A * | 4/1984 | Rico | ............. | A61C 3/14 433/158 |
| 4,923,399 A * | 5/1990 | Funderburg, Jr. | ....... | A61C 3/16 433/153 |

(Continued)

*Primary Examiner* — Matthew M Nelson
(74) *Attorney, Agent, or Firm* — Nath, Goldberg & Meyer; Joshua B. Goldberg

(57) ABSTRACT

A crown remover is provided. The crown remover is a crown removing dental appliance including a tray having a base, a buccal side vertical prong extending along an entire first side of the tray, and a palatal side vertical prong extending along an entire second side of the tray located opposite the first side. A buccal side vertical prong screw allows for adjustability of the buccal side vertical prong and a palatal side vertical prong screw allowing for adjustability of the palatal side vertical prong. A buccal side horizontal projection is located on the buccal side vertical prong and protrudes toward the center of the tray. A palatal side horizontal projection is located on the palatal side vertical prong and protrudes toward the center of the tray. A handle protrudes from the base.

6 Claims, 5 Drawing Sheets

(56) References Cited

U.S. PATENT DOCUMENTS

| | | | | |
|---|---|---|---|---|
| 5,575,656 | A | 11/1996 | Hajjar | |
| 7,303,395 | B2 * | 12/2007 | Hornig | A61C 3/14 433/152 |
| 7,938,645 | B2 * | 5/2011 | Sapian | A61C 3/14 433/152 |
| 9,173,719 | B2 * | 11/2015 | Golden | A61C 3/14 |
| 2003/0039943 | A1 | 2/2003 | Worthington | |
| 2004/0126741 | A1 * | 7/2004 | Hornig | A61C 3/14 433/152 |
| 2009/0017420 | A1 * | 1/2009 | Jabri | A61C 3/06 433/136 |
| 2011/0045435 | A1 * | 2/2011 | Goodman | A61C 3/14 433/159 |
| 2011/0212406 | A1 | 9/2011 | Jensen | |
| 2012/0156645 | A1 * | 6/2012 | Jacoby | A61C 8/0066 83/471 |
| 2013/0216977 | A1 * | 8/2013 | Sato | A61C 8/0081 433/189 |
| 2016/0228211 | A1 | 8/2016 | Pham | |

\* cited by examiner

CROWN REMOVER

CROSS-REFERENCE TO RELATED APPLICATIONS

This application is a continuation-in-part of U.S. patent application Ser. No. 18/392,645, filed on Dec. 21, 2023.

BACKGROUND

Field

The disclosure of the present patent application relates to dental appliances, and particularly to a dental appliance for removing a crown.

Description of Related Art

It is not uncommon for old dental crowns or bridges to require removal. There are several known materials and techniques that are used for such purposes. Such conventional materials and techniques, however, suffer from a number of drawbacks, particularly in the form of damage to the existing crown or prosthesis and/or the underlying tooth. During traditional crown removal, a dentist carefully cuts through the dental cement or adhesive that holds the crown in place using specialized dental tools, such as a dental drill or a conventional crown remover. This process may require time and precision to avoid damaging the underlying tooth structure. Conventional crown removers are often in the form of clamps, requiring great skill and care to prevent undue pressure and/or slippage damaging the crown and/or the tooth.

The dentist gently removes the crown from the tooth once the crown is loosened. Sometimes, the crown may need to be fractured or sectioned to facilitate removal without harming the tooth. This stage, similar to the above, also requires great skill and care to prevent damage to the underlying tooth and/or the surrounding tissue in the patient's mouth. Typical crown removers are, essentially, modified clamps for gripping and pulling the crown which, when mishandled, can easily injure the patient. Thus, a crown remover solving the aforementioned problems is desired.

SUMMARY

The crown remover includes a tray having a base, a buccal side vertical prong extending along an entire first side of the tray, and a palatal side vertical prong extending along an entire second side of the tray located opposite the first side. A buccal side vertical prong screw is provided for adjusting the buccal side vertical prong. Similarly, a palatal side vertical prong screw is provided for adjusting the palatal side vertical prong. A buccal side horizontal projection is located on the buccal side vertical prong and protrudes toward the center of the tray. Similarly, a palatal side horizontal projection is located on the palatal side vertical prong and protrudes toward the center of the tray. A handle is secured to, and protrudes from, the base.

In an alternative embodiment of the crown remover, the crown remover has a tray with a base, a buccal side vertical prong and a palatal side vertical prong. Each of the buccal and palatal side vertical prongs has opposed upper and lower edges, with the lower edges thereof being respectively secured to laterally opposed edges of the base. A buccal side, vertically adjustable member is slidably mounted on an exterior face of the buccal side vertical prong. The buccal side, vertically adjustable member has a buccal side vertical portion and a buccal side horizontal projection, with the buccal side horizontal projection projecting toward a center of the tray. Similarly, a palatal side, vertically adjustable member is slidably mounted on an exterior face of the palatal side vertical prong. The palatal side, vertically adjustable member has a palatal side vertical portion and a palatal side horizontal projection, with the palatal side horizontal projection projecting toward the center of the tray. The buccal side horizontal projection and the palatal side horizontal projection are each individually vertically adjustable with respect to the tray.

For the vertical adjustment of the vertically adjustable members, a buccal side vertically-extending sleeve may be mounted on the exterior face of the buccal side vertical prong for slidably receiving the buccal side vertical portion of the buccal side, vertically adjustable member. Similarly, a palatal side vertically-extending sleeve may be mounted on the exterior face of the palatal side vertical prong for slidably receiving the palatal side vertical portion of the palatal side, vertically adjustable member.

In order to releasably lock the vertically adjustable members in place, each of the buccal side vertically-extending sleeve and the buccal side vertical portion of the buccal side, vertically adjustable member may have slots formed therethrough for releasably receiving at least one buccal side locking pin for releasably locking the buccal side, vertically adjustable member in place with respect to the buccal side vertical prong. Similarly, each of the palatal side vertically-extending sleeve and the palatal side vertical portion of the palatal side, vertically adjustable member may have slots formed therethrough for releasably receiving at least one palatal side locking pin for releasably locking the palatal side, vertically adjustable member in place with respect to the palatal side vertical prong. The handle may have an opening formed therethrough for engaging a conventional hooked crown remover or the like. Additionally, surfaces of the buccal side horizontal projection and the palatal side horizontal projection which face the base of the tray may be textured for frictional engagement with a crown being removed.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
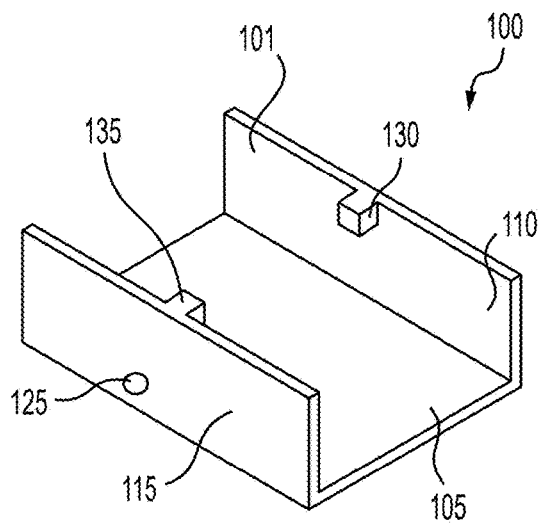
FIG. 1 is a perspective view of a crown remover.
Figure 2:
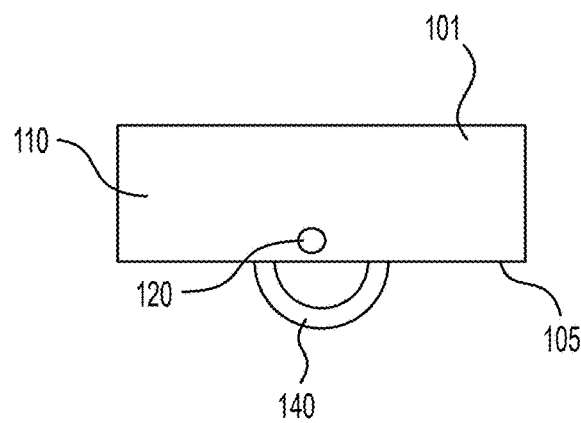
FIG. 2 is a side view of the crown remover.

Now referring to FIGS. 1-4, crown remover 100, which is a crown removing dental appliance, includes a tray 101. As shown, the tray 100 includes a base 105, a buccal side vertical prong 110 extending along an entire first side of the tray 100, and a palatal side vertical prong 115 extending along an entire second side of the tray 100 and located opposite the first side. A buccal side vertical prong screw 120 allows for vertical adjustability of the buccal side vertical prong 110 and a palatal side vertical prong screw 125 allows for vertical adjustability of the palatal side vertical prong 115.

The buccal side vertical prong screw 120 can be loosened, allowing the buccal side vertical prong 110 to be moved in the vertical direction (with respect to base 105) to a desired position. The buccal side vertical prong screw 120 can then be tightened to lock the buccal side vertical prong 110 into place (with respect to base 105). Likewise, the palatal side vertical prong screw 125 can be loosened, allowing the palatal side vertical prong 115 to be moved in the vertical direction to a desired position. The palatal side vertical prong screw 125 can then be tightened to lock the palatal side vertical prong 115 into place.

A buccal side horizontal projection 130 is located on the buccal side vertical prong 110 and protrudes toward the center of the tray 100. A palatal side horizontal projection 135 is located on the palatal side vertical prong 115 and protrudes toward the center of the tray 100. A handle 140 protrudes downward from the base 105. In the non-limiting example of FIG. 2, handle 140 is shown as a ring, although it should be understood that handle 140 may have any suitable shape and relative dimensions. Handle 140 acts as a point of application for a conventional hooked crown remover.

Figure 3:
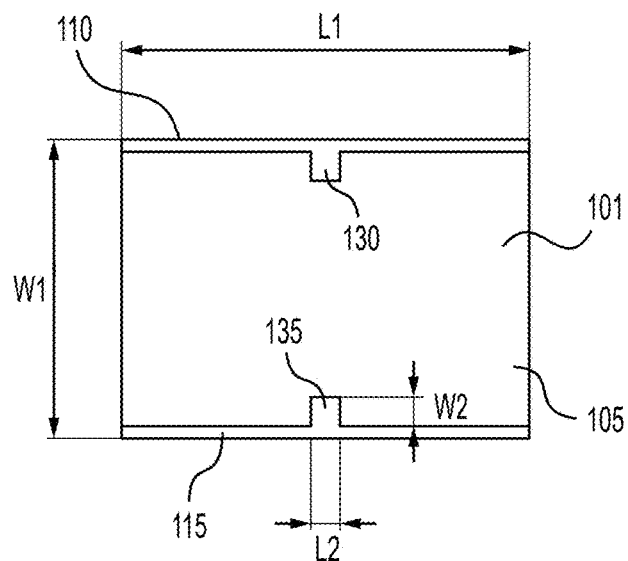
FIG. 3 is a top view of the crown remover.
Figure 4:
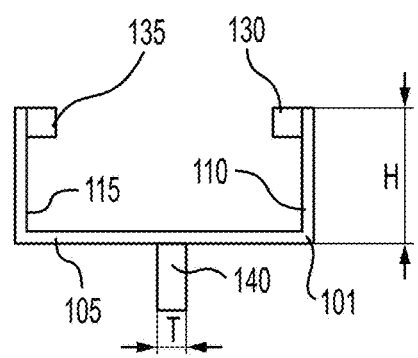
FIG. 4 is a front view of the crown remover.
Figure 5:
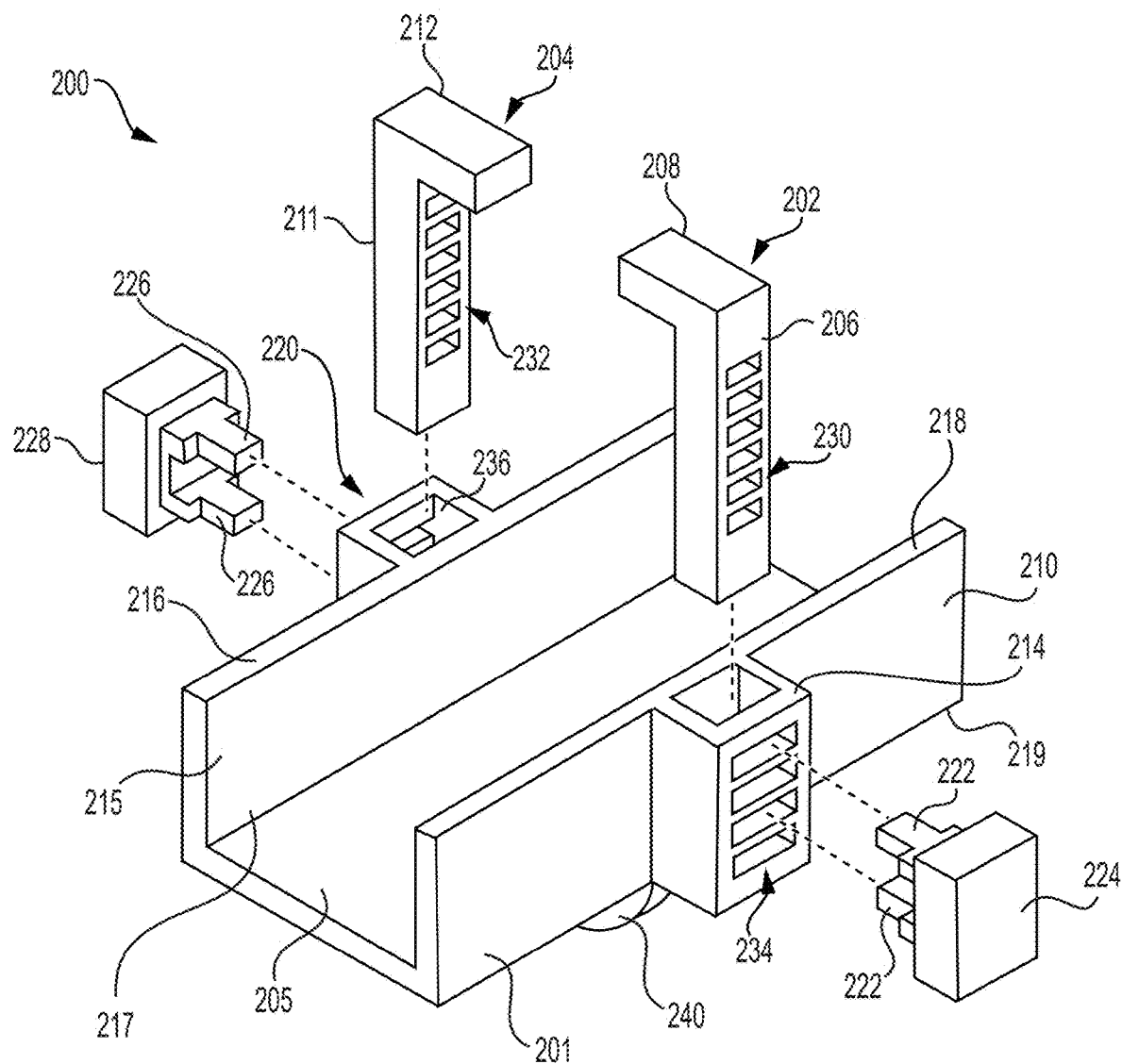
FIG. 5 is an exploded perspective view of an alternative embodiment of the crown remover.
Figure 6:
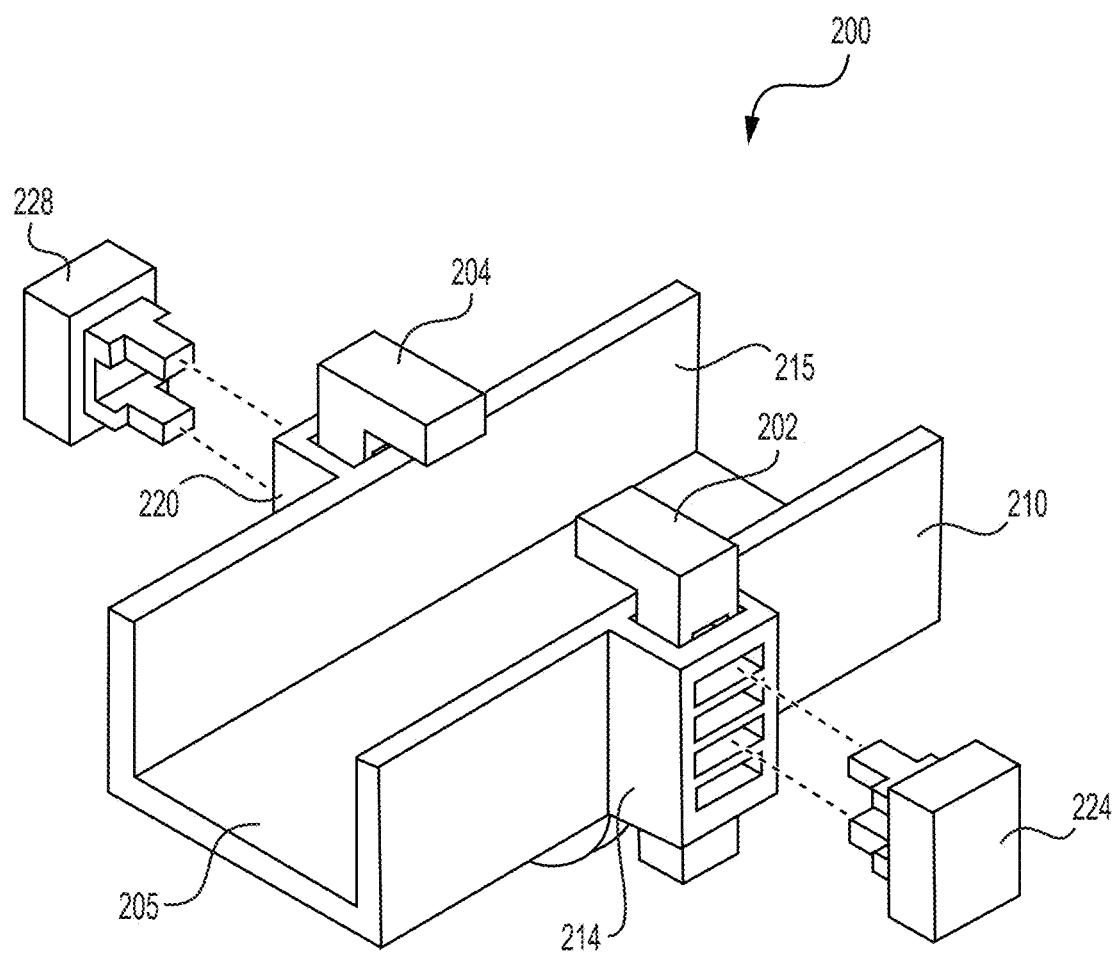
FIG. 6 is a partially exploded perspective view of the crown remover of FIG. 5.
Figure 7:
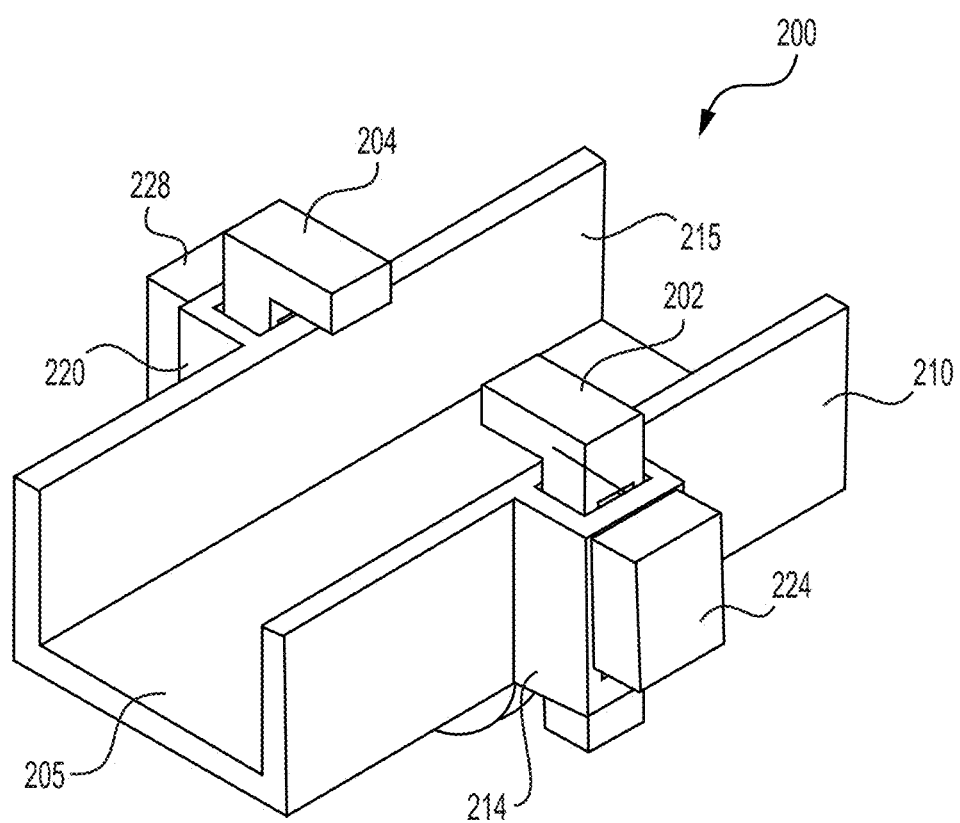
FIG. 7 is a perspective view of the crown remover of FIG. 5.

As shown in FIG. 3, the buccal side vertical prong 110 and the palatal side vertical prong 115 each has a length L1, and the base 105 has a width W1. As non-limiting examples, length L1 may be 30 mm and width W1 may be 22 mm. The palatal side horizontal projection 135 may be substantially equal in dimensions to the buccal side horizontal projection 130, and each has a length L2 and a width W2. As non-limiting examples, length L2 and width W2 may each be 2 mm. As a further non-limiting example, the buccal side vertical prong 110 and the palatal side vertical prong 115 may each have a thickness of 1 mm. As shown in FIG. 4, each of the buccal side vertical prong 110 and the palatal side vertical prong 115 has a height H. As a non-limiting example, height H may be 10 mm. The handle 140 has a thickness T. As a non-limiting example, thickness T may be 2 mm. For the non-limiting example of the ring-shaped handle 140 of FIG. 2, the inner radius of handle 140 may be 3.5 mm and the outer radius of handle 140 may be 5 mm.

In use, two small rectangular holes are drilled on the cervical (i.e., near the gum) third of a crown. The tray 101 is filled with a rigid elastomeric impression material and the vertical prongs 110, 115 are vertically adjusted (with respect to base 105) to align buccal side horizontal projection 130 and palatal side horizontal projection 135, respectively, with the two holes drilled in the crown. The tray 101 is filled with the impression material just within a region near the holes, such that the holes are not covered with the material. After the impression material sets, a conventional hooked crown remover engages the handle 140 and the remover 100 is tapped. This allows safe removal of the crown with minimal damage to the existing crown and no damage to the tooth structure.

In the alternative embodiment shown in FIGS. 5-8, the crown remover 200 includes a tray 201 which is similar to tray 101 of the previous embodiment. Tray 201 includes a base 205, a buccal side vertical prong 210 and a palatal side vertical prong 215. The buccal side vertical prong 210 has opposed upper and lower edges 218, 219, respectively, and the palatal side vertical prong 215 has opposed upper and lower edges 216, 217. The lower edges 217, 219 are respectively secured to laterally opposed edges of the base 205.

A buccal side, vertically adjustable member 202 is slidably mounted on an exterior face of the buccal side vertical prong 210. The buccal side, vertically adjustable member 202 has a buccal side vertical portion 206 and a buccal side horizontal projection 208, with the buccal side horizontal projection 208 projecting toward a center of the tray 205, as shown. Similarly, a palatal side, vertically adjustable member 204 is slidably mounted on an exterior face of the palatal side vertical prong 215. The palatal side, vertically adjustable member 204 has a palatal side vertical portion 211 and a palatal side horizontal projection 212, with the palatal side horizontal projection 212 projecting toward the center of the tray 205.

The buccal side horizontal projection 208 and the palatal side horizontal projection 212 are each individually vertically adjustable with respect to the tray 201 by adjustable sliding within respective sleeves 214, 220 or the like. As shown, a buccal side vertically-extending sleeve 214 may be mounted on the exterior face of the buccal side vertical prong 210 for slidably receiving the buccal side vertical portion 206 of the buccal side, vertically adjustable member 202. Similarly, a palatal side vertically-extending sleeve 220 may be mounted on the exterior face of the palatal side vertical prong 215 for slidably receiving the palatal side vertical portion 211 of the palatal side, vertically adjustable member 204.

In order to releasably lock the vertically adjustable members 202, 204 in place, the buccal side vertically-extending sleeve 214 and the buccal side vertical portion 206 of the buccal side, vertically adjustable member 202 may have slots 234, 230, respectively, formed therethrough for releasably receiving at least one buccal side locking pin 222 for releasably locking the buccal side, vertically adjustable member 202 in place with respect to the buccal side vertical prong 210. In the non-limiting example of FIGS. 5 and 6, two such locking pins 222 are shown attached to a common mount 224, which is provided for gripping by the user's fingers. It should be understood that any suitable number of locking pins 222 may be used, either with or without any suitable type of additional mount.

Similarly, the palatal side vertically-extending sleeve 220 and the palatal side vertical portion 211 of the palatal side, vertically adjustable member 204 may also have slots 236, 232, respectively, formed therethrough for releasably receiving at least one palatal side locking pin 226 for releasably locking the palatal side, vertically adjustable member 204 in place with respect to the palatal side vertical prong 215. In the non-limiting example of FIGS. 5 and 6, two such locking pins 226 are shown attached to a common mount 228, which is provided for gripping by the user's fingers. It should be understood that any suitable number of locking pins 226 may be used, either with or without any suitable type of additional mount.

Figure 8:
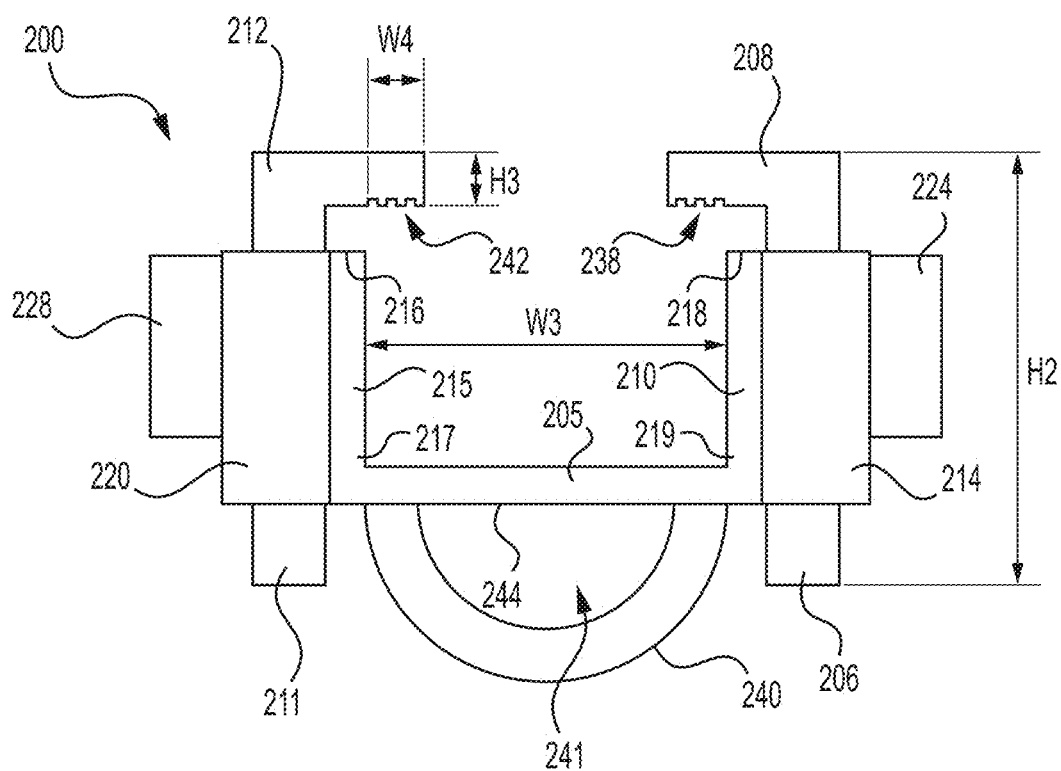
FIG. 8 is a front view of the crown remover of FIG. 5.

As best seen in FIG. 8, the handle 240 may have an opening 241 formed therethrough for engaging a conventional hooked crown remover or the like. Additionally, surfaces 238, 242 of the buccal side horizontal projection 208 and the palatal side horizontal projection 212, respectively, which face the base 205 of the tray 201 may be textured for frictional engagement with a crown being removed. The textured surfaces 238, 242 each have a width W4 which, as a non-limiting example, may be between 1.5 and 2.0 mm. The horizontal projections 208, 212 each have a height H3 which, as a non-limiting example, may be between 1.0 and 1.5 mm. The buccal and palatal side vertical portions 206, 211, respectively, each has a height H2 which, as a non-limiting example, may be 12.0 mm. The width of base 205, extending between the inner surfaces of prongs 210 and 215, has a width W3 which, as a non-limiting example, may be 10.0 mm. The handle 240, as a non-limiting example, may be ring-shaped and may have an inner radius of 3.5 mm and an outer radius of 5.0 mm. The overall length of tray 201 may be 25.0 mm, as a non-limiting example, and the height of each of prongs 210, 215 may be 7.0 mm, as a further non-limiting example. The horizontal projections 208, 212 may each have a longitudinal thickness of between 2.0 and 3.0 mm, as a non-limiting example.

It is to be understood that the crown remover is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A crown remover, comprising:
    a tray having a base, a buccal side vertical prong and a palatal side vertical prong, wherein each of the buccal and palatal side vertical prongs has opposed upper and lower edges, the lower edges thereof being respectively secured to laterally opposed edges of the base;
    a buccal side, vertically adjustable member slidably mounted on an exterior face of the buccal side vertical prong, the buccal side, vertically adjustable member having a buccal side vertical portion and a buccal side horizontal projection, wherein the buccal side horizontal projection projects toward a center of the tray;
    a palatal side, vertically adjustable member slidably mounted on an exterior face of the palatal side vertical prong, the palatal side, vertically adjustable member having a palatal side vertical portion and a palatal side horizontal projection, wherein the palatal side horizontal projection projects toward the center of the tray; and
    a handle protruding from the base,
    wherein the buccal side horizontal projection and the palatal side horizontal projection are each individually vertically adjustable with respect to the tray.

2. The crown remover as recited in claim 1, further comprising:
    a buccal side vertically-extending sleeve mounted on the exterior face of the buccal side vertical prong for slidably receiving the buccal side vertical portion of the buccal side, vertically adjustable member; and
    a palatal side vertically-extending sleeve mounted on the exterior face of the palatal side vertical prong for slidably receiving the palatal side vertical portion of the palatal side, vertically adjustable member.

3. The crown remover as recited in claim 2, wherein each of the buccal side vertically-extending sleeve and the buccal side vertical portion of the buccal side, vertically adjustable member has slots formed therethrough for releasably receiving at least one buccal side locking pin for releasably locking the buccal side, vertically adjustable member in place with respect to the buccal side vertical prong, and
    wherein each of the palatal side vertically-extending sleeve and the palatal side vertical portion of the palatal side, vertically adjustable member has slots formed therethrough for releasably receiving at least one palatal side locking pin for releasably locking the palatal side, vertically adjustable member in place with respect to the palatal side vertical prong.

4. The crown remover as recited in claim 1, wherein the handle is secured to an exterior face of the base.

5. The crown remover as recited in claim 1, wherein surfaces of the buccal side horizontal projection and the palatal side horizontal projection facing the base are textured for frictional engagement with a crown being removed.

6. The crown remover as recited in claim 1, wherein the handle has an opening formed therethrough.

* * * * *